United States Patent [19]

Amiot

[11] 4,213,569
[45] Jul. 22, 1980

[54] DOMESTIC ELECTRICAL APPLIANCE

[75] Inventor: Jacques H. J. Amiot, Alencon, France

[73] Assignee: Moulinex, Société Anonyme, Bagnolet, France

[21] Appl. No.: 25,452

[22] Filed: Mar. 29, 1979

[30] Foreign Application Priority Data

Apr. 14, 1978 [FR] France .................... 78-11055

[51] Int. Cl.² ............... B02C 18/12; B02C 18/24
[52] U.S. Cl. .................... 241/37.5; 241/282.1
[58] Field of Search ......... 241/36, 37.5, 92, 199.12, 241/282.1, 282.2

[56] References Cited

U.S. PATENT DOCUMENTS

| | | | |
|---|---|---|---|
| 3,528,469 | 9/1970 | Mantelet | 241/199.12 |
| 3,892,365 | 7/1975 | Verdun | 241/282.1 |
| 4,081,114 | 3/1978 | Bouillet | 241/282.1 X |
| 4,095,499 | 6/1978 | Ades | 241/36 X |
| 4,111,372 | 9/1978 | Hicks et al. | 241/37.5 |
| 4,113,188 | 9/1978 | Beunkoff | 241/37.5 |

FOREIGN PATENT DOCUMENTS 1923542  7/1965  Fed. Rep. of Germany.

*Primary Examiner*—Howard N. Goldberg
*Attorney, Agent, or Firm*—Young & Thompson

[57] ABSTRACT

A domestic electrical appliance has a base supporting a work bowl. A removable cover for closing the bowl is fixed to the base by a rotary coupling. A motor unit is housed in the base and rotates a working tool positioned within the bowl. A push button is provided for controlling operation of the motor unit. Depression of the push button to actuate the motor unit also prevents removal of the cover from the bowl. A safety lock is provided which moves automatically to its locked position upon depression of the push button and in its locked position prevents the push button returning to its initial retracted position.

8 Claims, 4 Drawing Figures

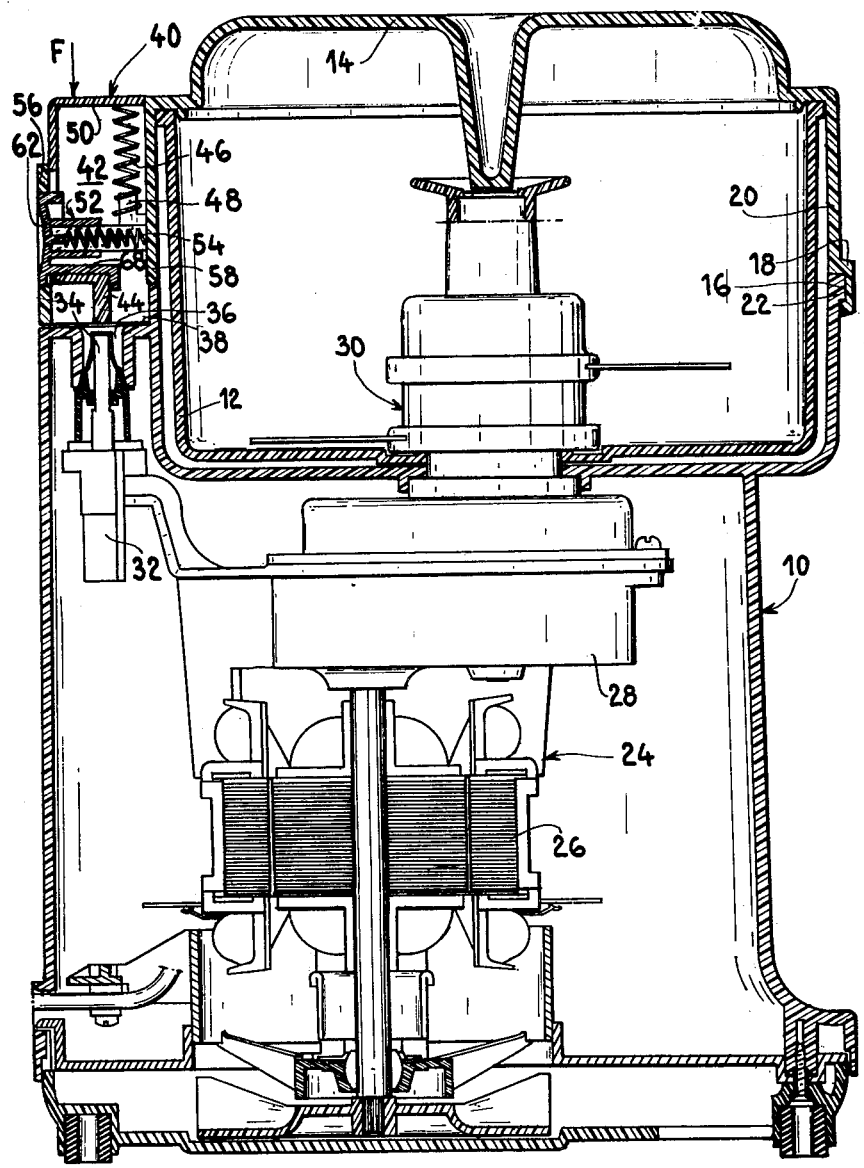

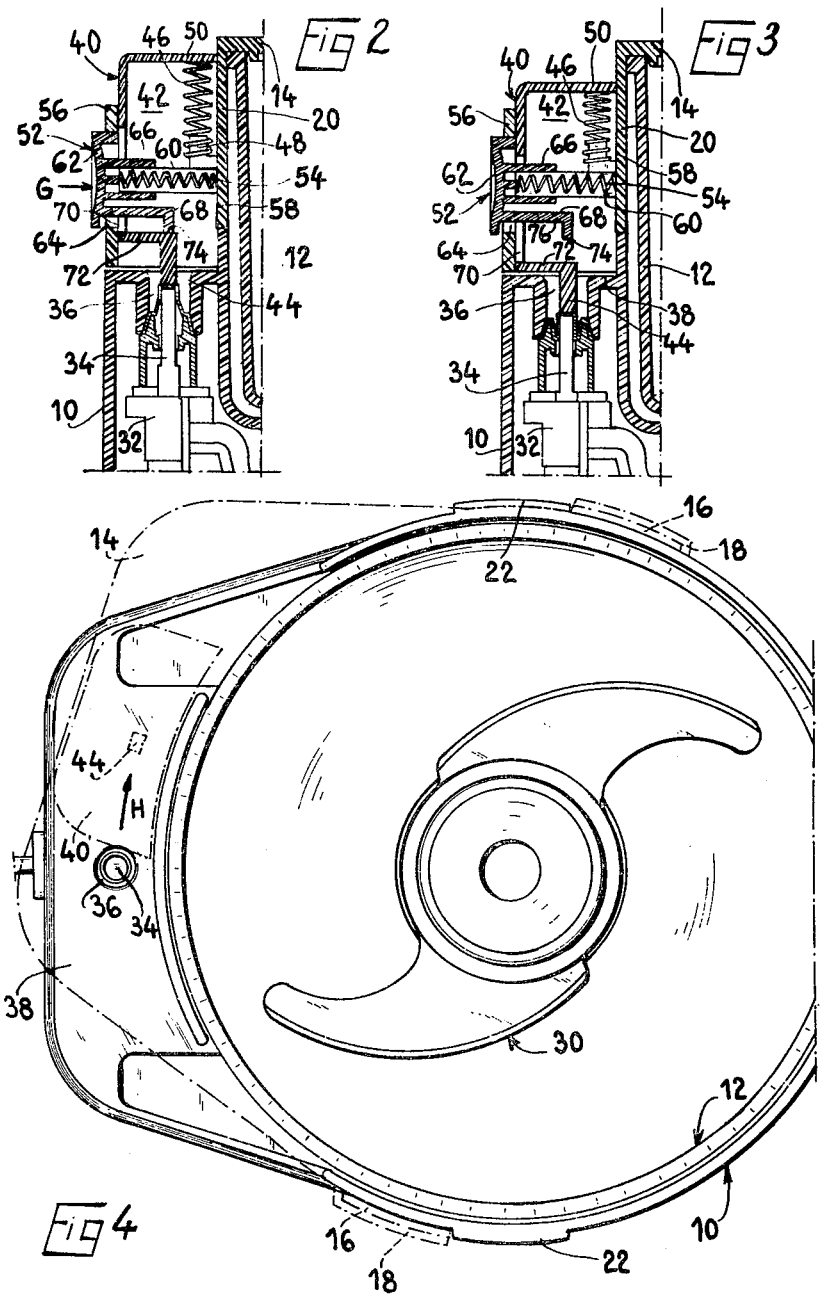

DOMESTIC ELECTRICAL APPLIANCE

BACKGROUND OF THE INVENTION

The invention relates to domestic electrical appliances for food processing, which comprise a base supporting a work bowl closed by a removable cover which is fixed to the said base by a rotary fixing device, a motor unit which is disposed in the base and having an output shaft which carries a working tool positioned within the bowl, and switch means to operate the motor unit.

Appliances of this type are known in which the switch means has a movable contact which is actuated by a push button. Such a push button can be movably mounted on the cover so that it occupies at least three positions; a retracted position, an intermediate cocked position in which it is arranged to prevent rotation, and therefore removal, of the cover, without however causing supply of electricity to the motor unit, and a fully depressed position in which it actuates the contact to supply current to the motor unit.

With such an appliance, when the user, after a food processing operation, moves the push button from its depressed position to its retracted position and then removes the cover, it can happen that the working tool, for example a rotary cutter, continues to rotate by inertia whereas the cover is already removed. There is then a risk of injury to the user's hand.

It is an object of this invention to minimize this risk.

SUMMARY

According to the present invention there is provided a domestic electrical appliance comprising a base, a work bowl carried by the base, a cover for closing the bowl, cooperable means on the base and the cover for removably fixing the cover to the base, said cooperable means being brought into and out of cooperation upon rotation of the cover relative to the base, a motor unit housed within the base and having an output shaft, a working tool mounted in said bowl and connected to said output shaft, switch means for operating said motor unit having a movable operating contact, a housing formed in said base, the movable contact of said switch means being received in said housing, and a push button for actuating said movable contact mounted on said cover, said push button being movable so as to occupy first, second and third positions, wherein, in its first, retracted position, the push button is out of engagement with the housing of the movable contact, in its second, cocked position, the push button is engaged in the entrance to the housing so as to prevent rotation of the cover relative to the base without actuating the switch means to operate the motor unit, and in its third, extended position, the push button extends further into said housing so as to actuate the switch means to operate the motor unit, and further comprising a safety lock mounted for movement relative to the push button, the safety lock being movable between a locked position in which it prevents the push button being moved to its first retracted position and an unlocked position in which it allows the push button to be moved to its first position, and elastic means for biassing said safety lock towards its locked position, wherein said safety lock is arranged such that movement of said push button from said first to said second position automatically causes said safety lock to be moved to its locked position by said elastic means.

Thus, at the commencement of any food processing operation, that is to say as soon as the user moves the push button from its retracted position to its extended position, passing through the cocked position, the safety lock automatically moves into its locked position, preventing direct return of the push button to its retracted position, that is to say preventing rotation of the cover on the base and therefore removal of this cover. In order to remove the cover, the user must move the safety lock to its unlocked position, thereby releasing the push button and so allowing the cover to be rotated.

BRIEF DESCRIPTION OF THE DRAWINGS

An embodiment of the present invention will hereinafter be described, by way of example, with reference to the accompanying drawings, in which:

FIG. 1 is a vertical section through a food processing appliance, for example a chopping machine, of the invention, showing an operating push button in its retracted position and a safety lock in its released position;

FIG. 2 is a vertical section showing the operating push button in its cocked position and the safety lock in its locked position;

FIG. 3 is a view similar to FIG. 2 showing the push button in its extended position, and FIG. 4 is a plan view of the appliance showing in solid lines the appliance without its cover and in broken lines a position which the cover occupies as it is removed from the appliance.

DESCRIPTION OF A PREFERRED EMBODIMENT

The chopping machine shown in FIG. 1 comprises a base 10 supporting a work bowl 12 closed by a removable cover 14. The cover 14 is fixed to the base 10 by a bayonet fitting comprising a plurality of horizontal grooves 16 which are each provided in the inner face of a boss 18 carried by a peripheral skirt 20 of the cover, each groove 16 engaging on a complementary horizontal rib 22 carried by the periphery of the base 10. Housed in the base 10 is a motor unit 24 comprising an electric motor 26 connected to a speed reduction unit 28. The output shaft of the speed reduction unit 28 carries a working cutter 30 which is positioned within the bowl 12.

The motor 26 is operated by an electric switch 32 having a movable operating contact 34 which is located inside a housing 36 provided in a horizontal face 38 of the base 10. This contact 34 is urged elastically upwardly and is operated by a push button 40 which is mounted to slide vertically in a passage 42 traversing the cover 14 from top to bottom and provided in a lateral extension of the peripheral skirt 20. A finger 44 arranged to come into contact with the contact 34 is provided at the lower end of the push button 40. The push button 40 is urged upwardly in the passage 42 by a spring 46 interposed between a fixed stop 48 carried by the skirt 20 and the top 50 of the push button. This push button can thus occupy at least three positions: a high or retracted position (FIG. 1) in which its finger 44 is out of the housing 36 of the contact; a midway or cocked position (FIG. 2) in which its finger 44 extends into the entrance to the housing 36 and is in contact with the contact 34 without however causing the supply of electricity to the motor, in this position, rotation of the cover 14 relative to the base 10 is prevented as the finger 44 would abut the housing 36; and a lowered or extended position (FIG. 3) in which the finger 44 extends more deeply into the housing 36 and actuates the contact 34 to supply power to the motor 26.

The appliance is provided with a safety lock 52 mounted to be movable between a locked position (FIGS. 2 and 3) and an unlocked position (FIG. 1). The lock is urged automatically to the locked position by a spring 54 as soon as the push button 40 is moved from its retracted position to its cocked position as shown in FIG. 2, and in its locked position the safety lock 52 prevents the push button 40 returning to its retracted position shown in FIG. 1. In its unlocked position, to which the safety lock can be moved against the spring 54, the lock 52 allows the push button 40 to return to its retracted position.

As can be seen in FIGS. 1 to 3, the lock 52 is disposed transversely in the passage 42 in which the push button 40 is vertically displaceable, between two opposite walls 56 and 58 of this passage, and it is mounted to slide horizontally on two spaced guides 60 (of which only one can be seen in FIGS. 1 to 3) rigidly fixed to the wall 58. The spring 54 is situated between these guides 60 and it is furthermore interposed between the wall 58 and an appropriate seat provided on the lock 52. This lock comprises a free part 62 forming an operating button which extends through an aperture 64 provided in the wall 56 and, in its locked position projects laterally outwardly of the cover 14, a rear part 66 on which is formed the seat for the spring 54, and a lower working part 68. The parts 66 and 68 extend, with vertical clearance through a port 70 provided in the push button 40.

The push button 40 has a horizontal shoulder 72 formed on the bottom edge of the port 70. In the cocked position of the push button 40 (FIG. 2) a horizontal bearing surface 74 provided on the working part 68 of the lock engages the horizontal shoulder 72. This working part 68 also has a second horizontal bearing surface 76 which is offset vertically upwardly from the bearing surface 74 and is also offset horizontally from the surface 74 in the direction in which the lock slides. In the retracted position of the push button 40 (FIG. 1) the second bearing surface 76 engages the horizontal shoulder 72.

For safety, the motor 26 is equipped with an electrical braking device operated by the operating contact 34 and therefore by the push button 40. This braking device (not visible in the drawings) is of the type to short-circuit the induction circuit of the motor. The braking device is operated by the movement of electrical contacts within the make-and-break switch 32, these contacts being operated by the contact 34 so that operation of the braking device occurs when the push button returns from its cocked position (FIG. 2) to its retracted position (FIG. 1), whereas in its cocked position (FIG. 2), the push button maintains the contact 34 in a midway position in which the braking device is out of service.

At the commencement of the food processing operation, the cover 14 is placed on the appliance in the position illustrated in FIG. 1. In order to start the appliance, the user moves the push button 40 (arrow F) from its retracted position (FIG. 1) to its extended position (FIG. 3), passing through the cocked position (FIG. 2). As the push button 40 moves into its cocked position, that is to say when the shoulder 72 is below the level of the bearing surface 74, the lock 52 escapes the stop formed by the rear edge of this shoulder and is pushed outwardly by the spring 54. Thus, the lock 52 moves automatically into its locked position (FIGS. 2 and 3) in which the bearing surface 74 is located above the shoulder 72. Once the safety lock 52 is in its locked position, the push button 40 can no longer return, under the force of the spring 46, to its retracted position. Thus, if the user releases the push button 40 in order to stop the appliance, the push button 40 will be urged by the spring 46 only to its cocked position. In the cocked position, the finger 44 remains partially engaged in the entrance to the housing 36 of the contact 34 and so prevents rotation of the cover 14 relative to the base and hence prevents removal of this cover. Although in the cocked position there is no longer a supply of power to the motor, if the cutter 30 continues to rotate in the bowl 12, there is no danger of injury to the user because the cutter is protected by the cover.

In order to remove the cover, the user is required to exert lateral pressure on the lock 52 in the direction of the arrow G (FIG. 2) against the action of the spring 54 in order to move this lock into the unlocked position, that is to say in order to move the bearing surface 74 inwardly, thereby allowing the push button 40 to move upwardly under the action of the spring 46 until such time as the shoulder 72 abuts against the second bearing surface 76 of the lock, which defines the retracted position of the push button (FIG. 1). Simultaneously with this upward movement of the push button, the contact 34 is moved from the position in FIG. 2 to that shown in FIG. 1, so rendering the brake operative. The cutter 30 stops immediately. At this moment, the finger 44 of the push button is completely clear of the housing 36 which allows the user to rotate the cover 14 in relation to the base (see arrow H in FIG. 4) until the grooves 16 are clear of the ribs 22 of the bayonet fixing device.

The safety properties of the chopping machine will be appreciated: not only can the user not remove the cover without having first operated the lateral lock 52 but stoppage of the cutter is ensured automatically as soon as this lock is operated.

I claim:

1. A domestic electrical appliance comprising a base, a work bowl carried by the base, a cover for closing the bowl, cooperable means on the base and the cover for removably fixing the cover to the base, said cooperable means being brought into and out of cooperation upon housed within the base and having an output shaft, a working tool mounted in said bowl and connected to said operable shaft, switch means for operating said motor unit having a movable operating contact, a housing formed in said base, the movable contact of said switch means being received in said housing, and a push button for actuating said movable contact mounted on said cover, said push button being movable so as to occupy first, second and third positions, wherein, in its first, retracted position, the push button is out of engagement with the housing of the movable contact, in its second, cocked position, the push button is engaged in the entrance to the housing so as to prevent rotation of the cover relative to the base without actuating the switch means to operate the motor unit, and in its third, extended position, the push button extends further into said housing so as to actuate the switch means to operate the motor unit, and further comprising a safety lock mounted for movement relative to the push button, the safety lock being movable between a locked position in which it prevents the push button being moved to its first retracted position and an unlocked position in which it allows the push button to be moved to its first position, and elastic means for biassing said safety lock towards its locked position, wherein said safety lock is arranged such that movement of said push button from said first to said second position automatically causes said safety lock to be moved to its locked position by said elastic means.

2. A domestic electrical appliance according to claim 1, further comprising an outer wall disposed laterally on the cover to define an elongate passage which is open at each end, and an aperture formed in said outer wall, said elongate passage being aligned with said housing of the movable contact when the cover is fixed to the base, wherein said push button is mounted to slide longitudinally of said passage, said push button being hollow and having a transverse wall and a longitudinally extending wall, a port being formed in said longitudinally extending wall, and wherein said safety lock extends through said aperture in said outer wall and through said port in the push button and is mounted to slide transversely of said passage, and said elastic means are disposed between said safety lock and said cover and bias said safety lock towards said outer wall.

3. A domestic electrical appliance according to claim 2, wherein the push button has a shoulder formed on said longitudinally extending wall, the shoulder extending transversely within the push button, and the safety lock includes a first transversely extending bearing surface, said first bearing surface being arranged to engage said shoulder in the cocked position of the push button to thereby prevent the push button being moved to its retracted position.

4. A domestic electrical appliance according to claim 3, wherein the safety lock includes a second transversely extending bearing surface which is transversely and longitudinally offset from said first bearing surface, said second bearing surface being arranged to engage said shoulder in the retracted position of the push button.

5. A domestic electrical appliance according to claim 2, further comprising transversely extending guide means mounted in said passage, said safety lock being mounted to slide on said guide means.

6. A domestic electrical appliance according to claim 2, wherein said housing of said movable contact is provided in a horizontal face of the base and extends substantially vertically, and wherein said passage extends substantially vertically, the push button being mounted to slide vertically in said passage and the safety lock being mounted to slide horizontally.

7. A domestic electrical appliance according to claim 1, further comprising means for elastically biassing said push button towards its retracted position.

8. A domestic electrical appliance according to claim 1, wherein said motor unit is equipped with braking means controlled by the movable operating contact and thus by said push button, said braking means being arranged to be operated upon return of the push button from its cocked position to its retracted position, and said braking means being arranged to be inoperative when the push button is in its cocked position.

* * * * *